United States Patent
Bush et al.

(10) Patent No.: US 10,460,715 B2
(45) Date of Patent: Oct. 29, 2019

(54) ACOUSTIC FLOOR UNDERLAY SYSTEM

(71) Applicant: Zephyros, Inc., Romeo, MI (US)

(72) Inventors: Kendall Bush, Macomb, MI (US);
Ryan Ligon, Almont, MI (US); Varun Mohan, Clinton Township, MI (US)

(73) Assignee: Zephyros, Inc., Romeo, MI (US)

( * ) Notice: Subject to any disclaimer, the term of this patent is extended or adjusted under 35 U.S.C. 154(b) by 166 days.

(21) Appl. No.: 15/542,945

(22) PCT Filed: Jan. 12, 2016

(86) PCT No.: PCT/US2016/013054
§ 371 (c)(1),
(2) Date: Jul. 12, 2017

(87) PCT Pub. No.: WO2016/115138
PCT Pub. Date: Jul. 21, 2016

(65) Prior Publication Data
US 2017/0372688 A1    Dec. 28, 2017

Related U.S. Application Data

(60) Provisional application No. 62/102,290, filed on Jan. 12, 2015.

(51) Int. Cl.
*G10K 11/168* (2006.01)
*B60R 13/08* (2006.01)
(Continued)

(52) U.S. Cl.
CPC .............. *G10K 11/168* (2013.01); *B32B 5/02* (2013.01); *B32B 37/14* (2013.01); *B60R 13/083* (2013.01);
(Continued)

(58) Field of Classification Search
CPC ........................... G60K 11/168; B60R 13/083
(Continued)

(56) References Cited

U.S. PATENT DOCUMENTS 3,061,491 A    10/1962    Sherrard
3,087,571 A    4/1963    Kerwin, Jr.
(Continued)

FOREIGN PATENT DOCUMENTS

AU    782550 B2    1/2001
AU    2005203796 A1    10/2005
(Continued)

OTHER PUBLICATIONS

Acoustic Textiles—Lighter, Thinner and More Sound-Absorbent, Technical Textiles International, International Newsletters, dated Sep. 2002, pp. 15-18.
(Continued)

*Primary Examiner* — Jason S Morrow
(74) *Attorney, Agent, or Firm* — The Dobrusin Law Firm, PC

(57) ABSTRACT

A flooring assembly comprising at least one first lofted lapped or airlaid bulk absorber layer 14 for acoustic absorption and compression resistance; at least one impedance layer 16 for one or more of acoustic impedance, compression resistance, and stiffness; at least one second lofted lapped airlaid bulk absorber layer 18 for acoustic absorption and compression resistance; and one or more optional densified fibrous air-flow resistive layers 12, 20.

20 Claims, 1 Drawing Sheet

(51) Int. Cl.
*B32B 5/02* (2006.01)
*B32B 37/14* (2006.01)

(52) U.S. Cl.
CPC ....... *B32B 2307/10* (2013.01); *B32B 2605/00* (2013.01)

(58) Field of Classification Search
USPC ........................................................ 296/39.3
See application file for complete search history.

(56) References Cited

U.S. PATENT DOCUMENTS

| | | | |
|---|---|---|---|
| 3,160,549 A | 12/1964 | Caldwell et al. | |
| 3,193,049 A | 7/1965 | Wollek | |
| 3,205,972 A | 9/1965 | Stricker | |
| 3,214,323 A | 10/1965 | Russell et al. | |
| 3,386,527 A | 6/1968 | Daubert et al. | |
| 3,523,859 A | 8/1970 | Komp | |
| 3,642,554 A | 2/1972 | Hensley | |
| 3,899,380 A | 8/1975 | Pihlstrom | |
| 3,978,179 A | 8/1976 | Sundhauss | |
| 3,994,363 A | 11/1976 | Hirao et al. | |
| 4,050,913 A | 9/1977 | Roach | |
| 4,096,007 A | 6/1978 | Braunling | |
| 4,131,664 A | 12/1978 | Flowers et al. | |
| 4,152,474 A | 5/1979 | Cook et al. | |
| 4,287,255 A | 9/1981 | Wong et al. | |
| 4,299,223 A | 11/1981 | Cronkrite | |
| 4,392,522 A | 7/1983 | Bschorr | |
| 4,399,851 A | 8/1983 | Bschorr | |
| 4,705,715 A | 11/1987 | DeCoste, Jr. et al. | |
| 4,830,140 A | 5/1989 | Fridh et al. | |
| 4,888,234 A | 12/1989 | Smith et al. | |
| 4,988,551 A | 1/1991 | Zegler | |
| 5,004,549 A | 4/1991 | Woods et al. | |
| 5,068,001 A | 11/1991 | Huassling | |
| 5,128,386 A | 7/1992 | Rehmer et al. | |
| 5,298,694 A | 3/1994 | Thmpson et al. | |
| 5,401,567 A | 3/1995 | Knobloch | |
| 5,410,111 A | 4/1995 | Stief et al. | |
| 5,459,291 A | 10/1995 | Haines et al. | |
| 5,492,580 A | 2/1996 | Frank | |
| 5,493,081 A | 2/1996 | Manigold | |
| 5,496,603 A | 3/1996 | Riedel et al. | |
| 5,504,282 A | 4/1996 | Pizzirusso et al. | |
| 5,550,338 A | 8/1996 | Hielscher | |
| 5,613,942 A | 3/1997 | Lucas et al. | |
| 5,635,270 A | 6/1997 | Fletcher | |
| 5,721,177 A | 2/1998 | Frank | |
| 5,733,824 A | 3/1998 | Brunka et al. | |
| 5,736,470 A | 4/1998 | Schneberger et al. | |
| 5,741,829 A | 4/1998 | Reich et al. | |
| 5,745,434 A | 4/1998 | Cushman | |
| 5,747,131 A | 5/1998 | Kreckel | |
| 5,773,080 A | 6/1998 | Simmons et al. | |
| 5,773,375 A | 6/1998 | Swan et al. | |
| 5,824,973 A | 10/1998 | Haines et al. | |
| 5,832,685 A | 11/1998 | Hermanson | |
| 5,841,081 A | 11/1998 | Thompson et al. | |
| 5,861,348 A | 1/1999 | Kase | |
| 5,866,235 A | 2/1999 | Fredrick et al. | |
| 5,886,306 A | 3/1999 | Patel et al. | |
| 5,906,883 A | 5/1999 | Blanc-Brude | |
| 5,955,174 A | 9/1999 | Wadsworth et al. | |
| 5,968,629 A | 10/1999 | Masui et al. | |
| 5,981,411 A | 11/1999 | Brown | |
| 6,008,149 A | 12/1999 | Copperwheat | |
| 6,048,809 A | 4/2000 | Brow et al. | |
| 6,102,465 A | 8/2000 | Nemoto et al. | |
| 6,103,180 A | 8/2000 | Haeseker et al. | |
| 6,145,617 A | 11/2000 | Alts | |
| 6,165,921 A | 12/2000 | Nagata et al. | |
| 6,198,016 B1 | 3/2001 | Lucast et al. | |
| 6,204,209 B1 | 3/2001 | Rozek et al. | |
| 6,220,388 B1 | 4/2001 | Sanborn | |
| 6,238,761 B1 | 5/2001 | Jeong et al. | |
| 6,244,314 B1 | 6/2001 | Dodt et al. | |
| 6,256,600 B1 | 7/2001 | Bolton et al. | |
| 6,296,075 B1 * | 10/2001 | Gish | B60R 13/083 |
| | | | 181/290 |
| 6,312,542 B1 | 11/2001 | Nagata et al. | |
| 6,345,688 B1 | 2/2002 | Veen et al. | |
| 6,376,396 B1 | 4/2002 | Thorn et al. | |
| 6,378,179 B1 | 4/2002 | Hirsch | |
| 6,390,563 B1 | 5/2002 | Haverkamp et al. | |
| 6,410,464 B1 | 6/2002 | Menzies et al. | |
| 6,419,729 B1 | 7/2002 | Duffy et al. | |
| 6,429,154 B1 | 8/2002 | Trotter | |
| 6,495,229 B1 | 12/2002 | Carte et al. | |
| 6,514,889 B1 | 2/2003 | Theoret et al. | |
| 6,524,691 B2 | 2/2003 | Sugawara et al. | |
| 6,534,145 B1 | 3/2003 | Boyles | |
| 6,541,105 B1 | 4/2003 | Park | |
| 6,598,636 B1 | 7/2003 | Schurmann et al. | |
| 6,755,483 B2 | 6/2004 | Yukawa et al. | |
| 6,821,597 B1 | 11/2004 | Price et al. | |
| 6,913,718 B2 | 7/2005 | Ducker et al. | |
| 7,201,253 B2 * | 4/2007 | Duval | G10K 11/168 |
| | | | 180/69.22 |
| 7,226,656 B2 | 6/2007 | Coates et al. | |
| 7,470,339 B2 | 12/2008 | Hoffmann et al. | |
| 7,514,026 B1 | 4/2009 | Zafiroglu | |
| 7,757,810 B2 | 7/2010 | Sparks et al. | |
| 7,757,811 B2 | 7/2010 | Fox et al. | |
| 7,867,601 B2 | 1/2011 | Ikishima et al. | |
| 8,153,219 B2 | 4/2012 | Hooft | |
| 8,365,862 B2 | 2/2013 | Coates et al. | |
| 8,534,419 B2 | 9/2013 | Coates et al. | |
| 2001/0000162 A1 | 4/2001 | Fletemier et al. | |
| 2001/0015249 A1 | 8/2001 | Mohr | |
| 2001/0023008 A1 | 9/2001 | Offermann et al. | |
| 2002/0011306 A1 | 1/2002 | Hannington et al. | |
| 2002/0015842 A1 | 2/2002 | Yanagiuchi | |
| 2002/0033215 A1 | 3/2002 | Aoki | |
| 2003/0066708 A1 | 4/2003 | Allison et al. | |
| 2003/0068943 A1 | 4/2003 | Fay | |
| 2003/0099810 A1 | 5/2003 | Allison et al. | |
| 2003/0188817 A1 | 10/2003 | Yukawa et al. | |
| 2003/0199216 A1 | 10/2003 | Gomez | |
| 2004/0021247 A1 | 2/2004 | Habisreitinger et al. | |
| 2004/0077738 A1 | 4/2004 | Field et al. | |
| 2004/0111817 A1 | 6/2004 | Chen et al. | |
| 2004/0131836 A1 | 7/2004 | Thompson | |
| 2004/0173298 A1 | 9/2004 | Boiocchi et al. | |
| 2004/0176003 A1 | 9/2004 | Yang et al. | |
| 2004/0180177 A1 | 9/2004 | Ray et al. | |
| 2004/0180592 A1 | 9/2004 | Ray | |
| 2004/0231915 A1 * | 11/2004 | Thompson, Jr. | B32B 5/02 |
| | | | 181/290 |
| 2004/0238275 A1 | 12/2004 | Keller et al. | |
| 2005/0084641 A1 | 4/2005 | Downs et al. | |
| 2005/0211358 A1 | 9/2005 | Tanno | |
| 2006/0090958 A1 | 5/2006 | Coates et al. | |
| 2006/0105664 A1 | 5/2006 | Zafiroglu | |
| 2006/0124387 A1 | 6/2006 | Berbner et al. | |
| 2006/0137799 A1 | 6/2006 | Haque et al. | |
| 2006/0289230 A1 | 12/2006 | Connelly et al. | |
| 2006/0289231 A1 | 12/2006 | Priebe et al. | |
| 2007/0190871 A1 | 8/2007 | Patel | |
| 2007/0277948 A1 | 12/2007 | Carbo et al. | |
| 2008/0001431 A1 | 1/2008 | Thompson et al. | |
| 2008/0050565 A1 | 2/2008 | Gross et al. | |
| 2008/0064794 A1 | 3/2008 | Murdock et al. | |
| 2008/0073146 A1 | 3/2008 | Thompson et al. | |
| 2008/0166940 A1 | 7/2008 | Nunn et al. | |
| 2008/0233348 A1 | 9/2008 | Ishiwatari et al. | |
| 2008/0251187 A1 | 10/2008 | Haque et al. | |
| 2008/0296087 A1 | 12/2008 | Tanaka et al. | |
| 2008/0311363 A1 | 12/2008 | Haskett et al. | |
| 2009/0071322 A1 | 3/2009 | Oxford et al. | |
| 2009/0148644 A1 | 6/2009 | Francis | |
| 2009/0162595 A1 | 6/2009 | Ko et al. | |
| 2009/0255619 A1 | 10/2009 | Tong | |
| 2010/0021667 A1 | 1/2010 | Yanagawa | |

(56) References Cited

U.S. PATENT DOCUMENTS

| | | | |
|---|---|---|---|
| 2010/0066121 A1* | 3/2010 | Gross | G10K 11/162 296/146.5 |
| 2010/0168286 A1 | 7/2010 | Gladfelter et al. | |
| 2010/0270101 A1 | 10/2010 | Yukawa | |
| 2010/0304109 A1 | 12/2010 | Schilling et al. | |
| 2011/0004414 A1 | 1/2011 | McKim | |
| 2011/0070794 A1 | 3/2011 | Gladfelter | |
| 2011/0082386 A1 | 4/2011 | Sheraton, Sr. | |
| 2011/0139543 A1 | 6/2011 | Coates et al. | |
| 2011/0159236 A1 | 6/2011 | Nakae et al. | |
| 2011/0226547 A1 | 9/2011 | Kühl et al. | |
| 2011/0274921 A1 | 11/2011 | Li et al. | |
| 2011/0293911 A1 | 12/2011 | Coates et al. | |
| 2012/0024626 A1 | 2/2012 | Coates et al. | |
| 2012/0037447 A1* | 2/2012 | Duval | B32B 5/22 181/290 |
| 2012/0058289 A1 | 3/2012 | Coates et al. | |
| 2013/0112499 A1* | 5/2013 | Kitchen | B32B 5/26 181/296 |
| 2013/0192921 A1 | 8/2013 | Coates et al. | |
| 2013/0327590 A1 | 12/2013 | Grube et al. | |
| 2016/0129855 A1* | 5/2016 | Check | B60R 13/083 181/290 |
| 2016/0307555 A1* | 10/2016 | Demo | B05D 1/02 |
| 2017/0274840 A1* | 9/2017 | Paik | E04F 13/08 |

FOREIGN PATENT DOCUMENTS

| | | |
|---|---|---|
| CA | 2350477 A1 | 5/2000 |
| CA | 2421458 A1 | 4/2004 |
| DE | 6930307 U | 12/1969 |
| DE | 19508335 A1 | 11/1995 |
| DE | 4424328 A1 | 1/1996 |
| DE | 10345575 B3 | 1/2005 |
| DE | 102004016934 A1 | 10/2005 |
| DE | 19714348 A1 | 2/2008 |
| DE | 102011079413 A1 | 1/2013 |
| EP | 0607946 B1 | 7/1994 |
| EP | 0909680 A1 | 4/1999 |
| EP | 0911185 A2 | 4/1999 |
| EP | 0949066 A2 | 10/1999 |
| EP | 1577123 B1 | 9/2005 |
| EP | 1640207 A1 | 3/2006 |
| EP | 1775714 A1 | 4/2007 |
| EP | 2312073 A1 | 4/2011 |
| GB | 823203 A | 11/1959 |
| GB | 2079626 A | 1/1982 |
| GB | 2322862 A | 9/1998 |
| GB | 2421251 A | 6/2006 |
| JP | S56-38080 A | 9/1982 |
| JP | 60-137528 U | 9/1985 |
| JP | 63-11541 U | 1/1988 |
| JP | 02-302484 A | 12/1990 |
| JP | H05-113020 | 7/1993 |
| JP | 7266802 A | 10/1995 |
| JP | H08-223855 A | 8/1996 |
| JP | H09-301088 | 11/1997 |
| JP | H10-121597 A | 5/1998 |
| JP | H10-148909 A | 6/1998 |
| JP | H10-156994 A | 6/1998 |
| JP | H10-237978 A | 9/1998 |
| JP | H10-273900 A | 10/1998 |
| JP | H10-280259 A | 10/1998 |
| JP | H11508328 A | 7/1999 |
| JP | 2000/310023 A | 7/2000 |
| JP | 2001/228879 A | 8/2001 |
| JP | 2001/348540 A | 12/2001 |
| JP | 2002/052634 A | 2/2002 |
| JP | 2002/67608 A | 3/2002 |
| JP | 2004/107605 | 8/2004 |
| JP | 2004/291549 A | 10/2004 |
| JP | 2005/036364 A | 2/2005 |
| JP | 2005/076144 A | 3/2005 |
| JP | 2006/104298 A | 4/2006 |
| JP | 2006/143867 A | 6/2006 |
| JP | 2006/160197 A1 | 6/2006 |
| JP | 2006/193838 A | 7/2006 |
| JP | 2006/273909 A | 10/2006 |
| JP | 2007/025044 A | 1/2007 |
| JP | 2007/512990 A | 5/2007 |
| JP | 2007/223273 A | 6/2007 |
| JP | 2008/068799 A | 3/2008 |
| JP | 2008/132972 A | 6/2008 |
| WO | 88/09406 A1 | 12/1988 |
| WO | 93/23596 A1 | 11/1993 |
| WO | 95/25634 A1 | 9/1995 |
| WO | 97/00989 A1 | 1/1997 |
| WO | 97/04445 A1 | 2/1997 |
| WO | 98/18656 A1 | 5/1998 |
| WO | 98/38370 A1 | 9/1998 |
| WO | 98/53444 A1 | 11/1998 |
| WO | 99/61963 A1 | 12/1999 |
| WO | 00/27671 A1 | 5/2000 |
| WO | 2000/032142 A1 | 6/2000 |
| WO | 00/53456 A1 | 9/2000 |
| WO | 2001/019306 A1 | 3/2001 |
| WO | 02/09089 A1 | 1/2002 |
| WO | 02/085648 A1 | 10/2002 |
| WO | 02/098643 A2 | 12/2002 |
| WO | 2003/000976 A1 | 1/2003 |
| WO | 03/069596 A1 | 8/2003 |
| WO | 03/074267 A1 | 9/2003 |
| WO | 03/097227 A1 | 11/2003 |
| WO | 2005/081226 A1 | 9/2005 |
| WO | 2006/107847 A2 | 10/2006 |
| WO | 2007/125830 A1 | 8/2007 |
| WO | 2009/039900 A1 | 4/2009 |
| WO | 2009/140713 A1 | 11/2009 |
| WO | 2010/042995 A1 | 4/2010 |
| WO | 2010/063079 A1 | 6/2010 |
| WO | 2010/094897 A2 | 8/2010 |
| WO | 2012/038737 A1 | 3/2012 |

OTHER PUBLICATIONS

Australian Examination Report dated Sep. 23, 2014; Appln. No. AU2009322091.
Australian Patent Application for Application No. AU 2009322091, Accepted Journal Date Oct. 29, 2015.
Australian Patent Examination Report No. 1, dated Oct. 22, 2013; Application No. 2009304593.
Bies Reference 1 of 7; Engineering Noise Control Theory and Practice; 3$^{rd}$ Edition (2003).
Bies Reference 2 of 7; Engineering Noise Control Theory and Practice; 3$^{rd}$ Edition (2003).
Bies Reference 3 of 7; Engineering Noise Control Theory and Practice; 3rd Edition (2003).
Bies Reference 4 of 7; Engineering Noise Control Theory and Practice; 3$^{rd}$ Edition (2003).
Bies Reference 5 of 7; Engineering Noise Control Theory and Practice; 3$^{rd}$ Edition (2003).
Bies Reference 6 of 7; Engineering Noise Control Theory and Practice; 3$^{rd}$ Edition (2003).
Bies Reference 7 of 7; Engineering Noise Control Theory and Practice; 3$^{rd}$ Edition (2003).
Chinese Office Action dated Feb. 4, 2014; Application No. CN200980156115.7.
Chinese Reexamination Notice dated May 21, 2015; Application No. 200980156115.7.
Chinese Second Office Action dated Jul. 10, 2013; Application No. CN200980156115.7.
DECI-TEX 3D, URL = http://web.archive.org/web/20070830042658 http://www.inccorp.com.au/page/deci_tex_3d.html#top, including nine (9) documents from links therein, download date Aug. 26, 2011, 19 pages.
European Extended Search Report dated Oct. 4, 2012.
European Office Action dated Oct. 15, 2013; Application No. 09829894.6.

(56) References Cited

OTHER PUBLICATIONS

European Office Action dated Oct. 19, 2012; Application No. 09829894.6.
Extended European Search Report dated May 18, 2015; Application No. 09820114.8.
International Search Report and the Written Opinion of the International Searching Authority for Application No. PCT/US2015/30742, dated Aug. 19, 2015.
International Search Report, dated Dec. 2, 2009, for PCT/AU2009/001363, 4 pages.
Japanese Office Action dated Apr. 15, 2014; Application No. 2011-538800.
Japanese Office Action dated Jul. 23, 2013; Application No. 2011-538800.
Japanese Office Action dated Jul. 8, 2014 (Application No. 2011-531303).
Japanese Office Action dated Oct. 15, 2013 (Application No. 2011-531303).
Japanese Office Action dated Sep. 17, 2013; Appln. No. 2011-509814.
Korean Notice of Preliminary Rejection dated Mar. 12, 2015; Application No. KR10-2010-7028868.
Korean Office Action dated Feb. 22, 2013.
Korean Office Action for Korean Application No. 1020117015473, dated Dec. 9, 2015.
Natural Fiber Based Lightweight Sound Absorber Materials, SAE Technical Paper Series, Jeffrey S. Hurley, Buckeye Technologies Inc., dated May 2007.
Samples of acoustic materials as summarized in Table 1 of Decision of a Delegate of the Commissioner of Patents Australian Patent Office issued in Feb. 24, 2006, for Application No. 2003100331.
Uno Ingard 1994.
European Communication dated May 31, 2018, Application No. 16708222.1.
European Communication dated Dec. 21, 2018, Application No. 16708222.1.
Translation of Japanese Final Rejection Office Action dated Sep. 9, 2014 (Appln. No. 2011-509814).

* cited by examiner

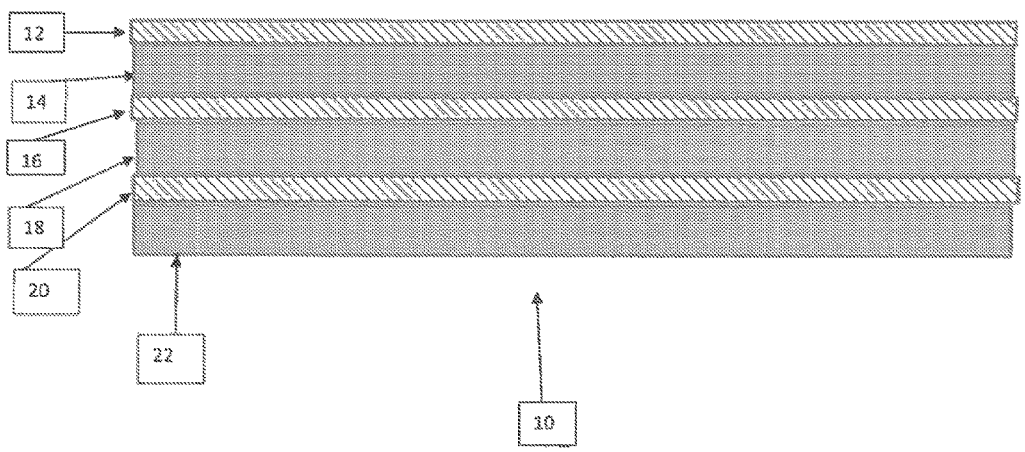

ACOUSTIC FLOOR UNDERLAY SYSTEM

FIELD

The present teachings relate generally to acoustic flooring assemblies comprising a lofted lapped or airlaid bulk absorber layers for acoustic absorption and compression resistance.

BACKGROUND

In a traditional transportation vehicle flooring system, a barrier/fiber or barrier/foam layer is utilized beneath a floor with added expanded polypropylene (EPP) or expanded polystyrene (EPS) foam blocks to fill the packaging space under the floor system and to add stiffness. EPP and EPS are close cell foams and as such do not function well acoustically. The original equipment manufacturer also has to install the foam blocks separately from the rest of the floor system, adding to the complexity and time of the installation process.

It would therefore be desirable to provide a lower mass, single piece solution that fills the entire packaging space (up to 100 mm), meets the compression resistance requirements and also meets the acoustic requirements (sound absorption and sound transmission loss) of a transportation vehicle flooring system. It would be further desirable to provide a flooring system that resists molding, is odor-free, non-toxic, non-resinated, and physically resistant to breaking (will not break down under repetitive handing and loading). There is also a further desire that the flooring system simplifies the installation process.

Accordingly, the present teachings provide for e flooring system that overcomes the aforementioned problems and meals the needs stated herein through the use of a vertically lapped fiber of a high thickness (thickness greater than traditional shoddy and cross-lapping operations) as a layer within a flooring assembly.

SUMMARY

The present teachings provide for a flooring assembly comprising at least one first lofted lapped or airlaid bulk absorber layer for acoustic absorption and compression resistance, at least one optional impedance layer for one or more of acoustic impedance, compression resistance, and stiffness and at least one second lofted lapped airlaid bulk absorber layer for acoustic absorption and compression resistance. The flooring assembly may further include one or more optional densified fibrous air-flow resistive layers.

The flooring assembly may include an impedance layer located in between and in direct planar contact with any two bulk absorber layers. The flooring assembly may include at least two lolled lapped or airlaid bulk absorber layers. The flooring assembly may include at least two impedance layers. The flooring assembly may include at least three lofted lapped or airlaid bulk absorber layers. The flooring assembly may include at least three impedance layers.

The teachings herein further provide for a method for forming a floor assembly comprising locating a first lofted lapped or airlaid bulk absorber layer into direct planar contact with a first impedance layer to form a first composite, locating a second lofted lapped or airlaid bulk absorber layer into direct planar contact with a second impedance layer to form a second composite, and molding the first composite and second composite together to form a final composite. The method may also include a slap of laminating the first lofted lapped or airlaid bulk absorber layer into direct planar contact with a first impedance layer. The method may also include a step of laminating the second lofted lapped or airlaid bulk absorber layer into direct planar contact with the second impedance layer. The method may also include a step of laminating the first composite with the second composite. The method may be free of any laminating steps. The method may include locating a third lofted lapped or airlaid bulk absorber layer into direct planar contact with a third impedance layer to form a third composite. The method may include molding the first composite, second composite, and a third composite together to form a final composite.

The teachings herein also provide for use of the flooring assembly described herein for flooring in a transportation vehicle.

DESCRIPTION OF THE DRAWINGS

FIG. 1 is an exemplary flooring assembly in accordance with the present teachings.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing date of U.S. Provisional Application Ser. No. 62/102, 290, filed Jan. 12, 2015, the contents of this application being hereby incorporated by reference herein for all purposes.

Acoustic materials, such as acoustic composite materials like the materials as discussed herein, may have a wide range of applications, such as where sound absorption and/or insulation are desired. For example, and not to serve as limiting, acoustic materials may be used in automotive applications (as one specific example, automotive flooring as discussed herein), generator set engine compartments, commercial vehicle engines, in-cab areas, architectural applications, and even heating, ventilating and air conditioning (HVAC) applications. Acoustic materials may be suitable for (but not limited to) use as sound attenuation materials in vehicles, attenuating sound originating from outside a cabin of a motor vehicle and propagating toward the inside of the cabin. Acoustic materials may be used in the engine cavity of a vehicle, on the inner and outer dash panels and under the carpeting in the cabin, for example. Acoustic materials may be used inside cabs to provide acoustic absorption. Acoustic materials may be used in any application where a lighter weight acoustic material is desired. Acoustic materials may be used as interior decorative trim, in which case it may be necessary to face the acoustic sheet with some form of decorative fabric or other covering. The acoustic sheets may be used in combination with other sound absorption materials.

In general, materials used for sound absorption (e.g., composite acoustic materials, nonwoven materials, woven materials, the like, or combination thereof) must exhibit air permeability properties. Critical characteristics include air flow resistance (resistance to air flow through the material), tortuosity (the path length of a sound wave within the material), and porosity (void to volume ratio). With fibrous materials, air flow resistance is an overwhelmingly critical factor controlling sound absorption. Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-B7 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The sound absorption coefficient (SAC) and sound transmission loss (STL) level of an air permeable or porous material, such as a bulk composite, may be improved end tuned by layering materials together. These layers may have different levels of specific air flow resistance. The building of these types of layers creates a multi-acoustic impedance mismatched profile throughout the thickness of the composite. This mismatched profile amplifies the noise reduction capability (both SAC and STL) of the composite. Surprisingly, the results are a noise reduction and/or sound absorption at a greater level than that of the summation of the performance of the individual layers as standalone units. Therefore, the layers of materials produce a generally synergistic effect to improve sound absorption performance.

The present teachings provide for a layered composite structure specifically engineered to provide sound absorption, sound transmission loss, and compression resistance properties for use as a molded cab-interior floor underlayment system for the transportation industry. The total (pre-molded) thickness of the layered composite, where the layers may or may not be bonded/laminated together before the molding process, may be at least about 50 mm thick, at least about 75 mm thick, at least about 85 mm thick, or even at least about 100 mm thick. The composite structure may be formed by multiple layers of vertical or rotary lapped fiber (airlaid would also be possible), layered with thin airflow resistive acoustic fabrics therebetween that impart acoustic and physical functionality to the composite.

Typically, the higher the air flow resistance and the greater the mismatch of the impedance between layers, the better the low frequency sound absorption capability of the layered composite will be. The composite may also be tuned to provide more general broad band absorption by adjusting the air flow resistance (AFR) and thicknesses of the various layers. This type of composite also begins to perform like a decoupled mass barrier system, which is traditionally used to block lower frequency sound, hence, the multi-impedance fibrous composite will begin to act like a sound transmission barrier at a lower mass.

Transportation floor mat underlayments typically include a heavy mass barrier layer to improve the transmission loss (TL) performance of the composite, but multi-AFR impedance mis-match vertically lapped composites as described in these teachings will act like a TL barrier, but will also provide sound absorption and a desirable level of physical compression resistance for use as a floor underlayment The composite includes one or more APR scrim layers that are designed in conjunction with the lofted/lapped/laid layers to meet or exceed the required compression resistance and resiliency targets set by the application, hence, the entire system works synergistically together. The AFR scrims may provide acoustic functionality and a dispersement of the compressive load applied during the compression cycle, allowing for the lolled under layers to be dialed back in mass/cost to meet the acoustic and compression targets. The finished composite may be molded in-situ with a carpet top layer, or a polymeric sheet top wear surface layer (PUR, vinyl, rubber, thermoplastic olefin, combinations thereof or the like).

By utilizing the synergistic performance of a multi-impedance mis-matched layered composite, the mass of material in each layer can be reduced. By comparison, a single or dual layered competitive product, such as an ethylene vinyl acetate or polyvinyl chloride solid barrier sheet facing on a fiber underpayment generally includes close cell EPP or EPS blocks which adds significantly to the mass and thickness of the composite. Reducing the mass of fiber in the matrix reduces material cost and manufacturing cost, as lighter weight lofted fiber layers can be produced faster than heavier weight layers.

The lofted/lapped/airlaid areas-can be tuned acoustically and physically by altering the chemical and physical properties of the fibers, the amounts of each type of engineered fiber in the blend, and the lapping or laying manufacturing method to produce the necessary acoustic and compressive resistance properties as demanded by the application.

The AFR scrim layers may improve acoustic performance, stiffness, and compression resistance properties to the entire system, allowing for the lofted/lapped/laid thicker layers to be engineered with a lower cost and lower mass fiber system. The teachings herein may also be used to target traditional decoupled mass/barrier systems in the marketplace used for sound transmission loss to block lower frequency noise, at a much lower mass level, and hence, a weight reduction option for transportation customers.

The composites may be formed by a lamination process to provide efficient in-line or off-line lamination so that the overall performance versus manufacturing cost ratio is very high compared to traditional materials. In some cases, the manufactured cost of the multi-layered system may be more efficient and less costly than that of a single layered system for the same acoustic performance. The layers may not need to be laminated together before the molding process, hence, the molding process may be used to in-situ laminate the layers together while the finished composite is being formed. Thus, a separate laminating step may not be necessary.

By utilizing the synergistic performance of a multi-impedance mismatched layered composite, mass of material in each layer may be reduced in comparison to traditional single or dual layered acoustic material (e.g., a non-faced or single low air flew resistance (APR) faced open cell foam or a single-scrim low AFR faced fiber). Reducing the mass of fiber in the matrix forming one or more layers of the acoustic composite may reduce material cost and/or manufacturing costs, as lighter weight layers (e.g., lofted fiber layers) may be produced more quickly than a heavier weight layer.

The performance of the multi-impedance systems may be about the same as or may even exceed that of traditional materials. However, multi-impedance systems may allow for lower overall composite thickness than traditional materials. The lower thickness of the multi-impedance acoustic composite may allow for better fitment into packaging space constrained areas. Shipping improvements may be realized since more material can be shipped in a finite volume at equal or greater acoustic performance as compared to a heavier and/or thicker sound absorption product. The acoustic composite may function to absorb sound to reduce noise. The acoustic composite may include one or more layers, and preferably a plurality of layers. The layers may be of different materials. Some layers may be of the same materials. The type of materials forming the layers, order of the layers, number of layers, thickness of layers, or a combination thereof, may be chosen based on the air flow resistive properties of each material, the desired air flow resistive properties of the acoustic composite as a whole, the desired weight, density and/or thickness of the acoustic composite (e.g., based upon the space available in the vehicle where the acoustic composite will be installed), or a combination thereof. For example, some layers may have a lower air flow resistance while other layers may have a higher air flow resistance. As mentioned above, the layering of layers having different air flow resistive properties produces a multi-impedance acoustic mismatched profile through the entire acoustic composite, which provides improved noise reduction capability of the composite layer. Therefore, the layers may be arranged so that a layer of higher specific air flow resistance is joined to or is adjacent to one or more layers of a different specific air flow resistance (e.g., a lower air flow resistance).

Any of the materials described herein may serve as one or more layers of the acoustic composite. Any of the materials described herein may be combined with other materials described herein (e.g., in the same layer or in different layers of the acoustic composite). The acoustic composite may include a plurality of layers, some or all of which serve different functions or provide different properties to the acoustic composite (when compared to other layers of the acoustic composite). The ability to combine layers of materials having different properties may allow the acoustic composite to be customized based on the application. For example, on(c) or mom acoustic composite layers may provide insulation. One or more acoustic composite layers may include one or more adhesive materials (e.g., as part of the fibers of the layer or as a separate element in or on the layer) for binding the fibers together, for binding layers together, or both. One or mora acoustic composite layers may support a facing material or top layer. One or more acoustic composite layers may provide beat resistance (e.g., if the acoustic composite is located in an area that is exposed to high temperatures). One or more acoustic composite layers may provide stiffness to the acoustic composite. One or more acoustic composite layers may provide flexibility and/or softness to the acoustic composite. One or more acoustic composite layers may attach directly to a wall or surface of a substrate to provide acoustic absorption. One or more acoustic composite layers may be any material known to exhibit sound absorption characteristics. One or more acoustic composite layers may ha at least partially formed from fibrous material. One or more acoustic composite layers may be at least partially formed as a web of material (e.g., a fibrous web). One or more acoustic composite layers may be formed from nonwoven material, such as short fiber nonwoven materials. One or more acoustic composite layers may be a porous bulk absorber (e.g., a lofted porous bulk absorber formed by a carding and/or lapping process). One or more acoustic composite layers may be formed by air laying. The acoustic composite (or one or more of the acoustic composite layers) may be an engineered 3D structure. It is clear from these potential layers that there is great flexibility in creating an acoustic material that meets the specific needs of an end user, customer, installer, and the like.

An acoustic composite layer (e.g., nonwoven material) may be formed to have a thickness and density selected according to the required physical and air permeability properties desired of the finished acoustic composite layer (and/or the acoustic composite as a whole). The acoustic composite layer may be any thickness depending on the application, location of installation, shape, fibers used (and the lofting of the acoustic composite layer), or oilier factors. The density of the acoustic composite layer may depend, in part, on the specific gravity of any additives incorporated into the material comprising the layer (such as nonwoven material), and/or the proportion of the final malarial that the additives constitute. Bulk density generally is a function of the specific gravity of the fibers and the porosity of the material produced from the fibers, which can be considered to represent the packing density of the fibers.

A low density acoustic composite material, which may be one or more of the acoustic composite layers, may be designed to have a low density, with a finished thickness of about 1.5 mm or more, about 4 mm or more, about 5 mm or more, about 8 mm or more, or about 8 mm or more. The finished thickness may be about 350 mm or less, about 250 mm or less, about 150 mm or less, about 75 mm or less, or about 50 mm or less. The acoustic composite material, which may be one or more of the acoustic composite layers, may be formed as a relatively thick, low density nonwoven, with a bulk density of 10 $kg/m^3$ or more, about 15 $kg/m^3$ or more, or about 20 $kg/m^3$ or more. The thick, low density nonwoven may have a bulk density of about 200 $kg/m^3$ or less, about 100 $kg/m^3$ or less, or about 60 $kg/m^3$ or less. The acoustic composite material (e.g., serving as one or more acoustic composite layers) thus formed may have an air flow resistivity of about 400 Rayls/m or more, about 800 Rayls/m or more, or about 100 Rayls/m or more. The acoustic composite material may have an air flow resistivity of about 200,000 Rayls/m or less, about 150,000 Rayls/m or less, or about 100,000 Rayls/m or less. Low density acoustic composite materials may even have an air flow resistivity of up to about 275,000 Rayls/m. Additional sound absorption may also be provided by a facing layer or layer of other material on the acoustic composite layer (e.g., by laminating or otherwise attaching or adhering to a surface of the acoustic composite layer). A scrim layer or other layer within the acoustic composite may include air flow resistive fabrics or films that may provide an air flow resistivity of about 275,000 Rayls/m or higher, 1,000,000 Rayls/m or higher, or even 2,000,000 Rayls/m or higher. For example, a scrim layer may have a thickness that is about 0.0005 m thick and may have a specific air flow resistance of about 1000 Rayls. Therefore, the air flow resistivity would be about 2,000,000 Rayls/m. In another example, a scrim layer may have a thickness of about 0.0005 inches, or about 0.013 mm, with a specific air flow resistance of about 1000 Rayls. Therefore air flow resistivity would be about 7,700,000 Rayls/m.

The material fibers that make up an acoustic composite material/layer may have a linear mass density from about 0.5 to about 25 denier, preferably about 1 to about 6 denier, more preferably about 1 to about 4 denier. The fibers may have a staple length of about 1.5 millimeters or greater, or even up to about 70 millimeters or greater (e.g., for carded fibrous webs). For example, the length of the fibers may be between about 30 millimeters and about 65 millimeters, with an average or common length of about 50 or 51 millimeters staple length, or any length typical of those used in fiber carding processes. Short fibers may be used in some other nonwoven processes, such as the formation of air laid fibrous webs. For example, some or all of the fibers may be a powder-like consistency (e.g., with a fiber length of about 2 millimeters to about 3 millimeters). Fibers of differing lengths may be combined to form the acoustic composite layer. The fiber length may vary depending on the application, the acoustic properties desired, dimensions and/or properties of the acoustic material (e.g., density, porosity, desired air flow resistance, thickness, size, shape, and the like of the acoustic layer), or any combination thereof. More effective packing of the shorter fibers may allow pore size to be more readily controlled in order to achieve desirable acoustic characteristics.

In some applications, the use of shorter fibers may have advantages in relation to the performance of the acoustic material. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flaw resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

The fibers forming one or more acoustic composite layers may be natural or synthetic fibers. Suitable natural fibers may include cotton, jute, wool, cellulose and ceramic fibers. Suitable synthetic fibers may include polyester, polypropylene, polyethylene, Nylon, aramid, imide, acrylate fibers, or combination thereof. The acoustic composite layer material may comprise polyester fibers, such as polyethylene terephthalate (PET), and co-polyester/polyester (CoPET/PET) adhesive bi-component fibers. The fibers may be 100% virgin fibers, or may contain fibers regenerated from postconsumer waste (for example, up to about 90% fibers regenerated from postconsumer waste).

One or more layers of the acoustic composite may include a plurality of bi-component fibers. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous web is heated to soften the sheath material of the bi-component may depend upon the physical properties of the sheath material. For a polyethylene sheath, the temperature may be about 140 degrees C to about 160 degrees C. For a polypropylene sheath, the temperature may be higher (for example, about 180 degrees C.). The bi-component fibers may be formed of short lengths chopped from extruded bi-component fibers. The bi-component fibers may have a sheath-to-core ratio (in cross-sectional area) of about 25% to about 35%.

The fibers of one or more layers of the acoustic composite may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation.

One or more of the layers of the acoustic composite may be a scrim layer. The scrim layer may be formed from woven or nonwoven fibers. The scrim layer may have a specific air flow resistance of about 50 mks Rayls or more, about 75 mks Rayls or more, or about 95 mks Rayls or more. The scrim layer may have a specific air flow resistance of about 20,000 mks Rayls or less, about 17.500 mks Rayls or less, or about 15,000 mks Rayls or less. For example, the scrim layer may have a specific air flow resistance of about 100 to about 10,000 mks Rayls.

Additional layers may be added to form the acoustic composite, such as any of the materials described herein. For example, an additional high AFR layer may be added. An additional lofted layer may be added instead of or in addition to the high AFR layer. The composite may have a stiffer bottom layer (e.g., the second lofted layer, or another layer). The stiffer bottom layer may provide compression resistance. The composite may have a softer top lofted layer (e.g., the first lofted layer) and may be designed to tune the acoustic absorption performance of the composite in conjunction with the high AFR layers (e.g., the top layer and middle layer).

The total thickness of the acoustic composite may depend upon the number and thickness of the individual layers. It is contemplated that the total thickness may be about 0.5 mm or more, about 1 mm or more, or about 1.5 mm or more. The total thickness may be about 300 mm or less, about 250 mm or less, or about 175 mm or less. For example, the thickness may be in the range of about 2 mm to about 155 mm. It is also contemplated that some of the individual layers may be thicker than other layers. For example, a lofted nonwoven absorption layer may be thicker than a layer having a high air flow resistance, such as a scrim layer or perforated film layer. The thickness may vary between the same types of layers as well. For example, two scrim layers in the acoustic composite may have different thicknesses. Two lofted nonwoven absorption layers may have different thicknesses. The composite may be tuned to provide more general broad band absorption by adjusting the specific air flow resistance and/or the thickness of any or all of the layers.

An adhesive may be located on the bottom layer (i.e., the layer of the acoustic composite opposite the top layer). The adhesive may allow for adhering the acoustic composite to a desired substrate. The acoustic material may be provided with a pressure sensitive adhesive (PSA). The PSA may be applied from a roll and laminated to the back side of the acoustic composite layer material (e.g., on the side of the acoustic composite layer opposite the facing layer or top layer), which may be performed concurrently with the lamination of the facing layer or top layer. A release liner may carry the PSA. Prior to installation of the acoustic material, the release liner may be removed from the pressure sensitive adhesive to allow the composite sound absorber to be adhered to a panel, substrate, or surface. For some acoustic materials intended to be used as input components, for example on a vehicle production line, it is desirable that the acoustic material can be installed quickly and easily. To achieve this, for some applications, it may be beneficial to provide a release liner with a high fear strength that is easy to remove.

As shown for example, at FIG. 1, the flooring assembly 10 includes a first facing layer 12 which may be a densified fibrous air flow resistive layer that may provide one or more of acoustic impedance, compressive resistance, and stiffness. The facing layer 12 may be located into direct planar contact with a first lofted lapped or airlaid bulk absorption layer that provides acoustic properties to the assembly in addition to providing compressive resistance. A first impedance layer 16 may be located on the face of the first bulk absorption layer 14 and may be a similar material to that of the facing layer 12. A second bulk absorption layer 18 may be located onto the first impedance layer 16 and a second impedance layer 20 (which may be the same as or different from layer 12 or layer 16) may be located onto the second bulk absorption layer 18. A third bulk absorber layer 22 may also be included.

The teachings herein may include processing by carding and lapping or simply air laying the thicker nonwoven layers (layers 14, 18, 22) and laminating these together with the higher AFR scrim layers (layers 12, 16, 20) within the nonwoven production and laminating process, or as separate processes. The lofted/laid layers (14, 18, 22) with the AFR scrims (12, 16, 20) may not need to be laminated together before molding to the floor pan shape, hence, the molding process may laminate the layers sufficiently together since the fibrous components will include thermoplastic binders to hold the matrix together, it is possible that AFR scrim layers may not be necessary in between every lofted layer.

This system may contain any number of AFR/lofted stack up (one, two, three, four layers, or more) and is not restricted to a tri-layer system as depleted in FIG. 1.

Multi-impedance layered systems allow for additional properties to b(c) incorporated, such as a stiffer lofted bottom layer (layers 18, 22) for compression resistance while the tap lofted layer (layer 14) may be softer and designed to tune the acoustic absorption performance of the composite in conjunction with high AFR scrim layers (layers 12 and 16). This capability will allow for a multi-functional system to incorporate additional key properties beyond acoustics.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A flooring assembly comprising:
    a) at least one first lofted, lapped, or airlaid bulk absorber layer for acoustic absorption and compression resistance;
    b) at least one impedance layer for one or more of acoustic impedance, compression resistance, and stiffness;
    c) at least one second lofted, lapped, or airlaid bulk absorber layer for acoustic absorption and compression resistance; and
    d) one or more fibrous air-flow resistive layers.

2. The flooring assembly of claim 1, including 2 or more fibrous air-flow resistive layers.

3. The flooring assembly of claim 1, including two or more impedance layers for one or more of acoustic impedance, compression resistance, and stiffness.

4. The flooring assembly of claim 1, wherein at least one of the fibrous air-flow resistive layers is an impedance layer for one or more of acoustic impedance, compression resistance, and stiffness.

5. The flooring assembly of claim 1 including a third lofted, lapped, or airlaid bulk absorber layer for acoustic absorption and compression resistance.

6. The flooring assembly of claim 1, including an impedance layer located in between and in direct planar contact with the at least one first bulk absorber layer and the at least one second bulk absorber layer.

7. The flooring assembly of claim 1, including at least two lofted, lapped, or airlaid bulk absorber layers.

8. The flooring assembly of claim 1, including at least two impedance layers.

9. The flooring assembly of claim 1, including at least three lofted, lapped, or airlaid bulk absorber layers.

10. The flooring assembly of claim 1, including at least three impedance layers.

11. A method for forming the flooring assembly of claim 1 comprising:
    i. locating the first lofted, lapped, or airlaid bulk absorber layer into direct planar contact with a first impedance layer to form a first composite;
    ii. locating the second lofted, lapped, or airlaid bulk absorber layer into direct planar contact with a second impedance layer to form a second composite;

iii. molding the first composite and second composite together to form a final composite.

12. The method of claim 11, including a step of laminating the first lofted, lapped, or airlaid bulk absorber layer into direct planar contact with the first impedance layer.

13. The method of claim 11, including a step of laminating the second lofted, lapped, or airlaid bulk absorber layer into direct planar contact with the second impedance layer.

14. The method of claim 11, including a step of laminating the first composite with the second composite.

15. The method of claim 11, wherein the method is free of any laminating steps.

16. The method of claim 11, including locating a third lofted, lapped, or airlaid bulk absorber layer into direct planar contact with a third impedance layer to form a third composite.

17. The method of claim 11, including molding the first composite, second composite, and a third composite together to form a final composite.

18. The flooring assembly of claim 1 installed as flooring in a transportation vehicle.

19. The flooring assembly of claim 1, including at least two lofted, lapped, or airlaid bulk absorber layers, at least two impedance layers, and at least one fibrous air-flow resistive layer.

20. The method of claim 11, including installing the flooring assembly into a transportation vehicle.

* * * * *